United States Patent
Liu et al.

(10) Patent No.: US 12,123,996 B2
(45) Date of Patent: Oct. 22, 2024

(54) METHOD FOR EXPERIMENTALLY DETERMINING CRITICAL SAND-CARRYING GAS VELOCITY OF SHALE GAS WELLS

(71) Applicant: Southwest Petroleum University, Chengdu (CN)

(72) Inventors: Yonghui Liu, Chengdu (CN); Jinhong Jiang, Chengdu (CN); Chengcheng Luo, Chengdu (CN); Ning Wu, Chengdu (CN); Xuanzhi Zheng, Chengdu (CN); Xinke Tang, Chengdu (CN); Xin Li, Chengdu (CN); Zhengyang Liu, Chengdu (CN); Boren Yang, Chengdu (CN); Tianjian Liu, Chengdu (CN)

( * ) Notice: Subject to any disclaimer, the term of this patent is extended or adjusted under 35 U.S.C. 154(b) by 0 days.

(21) Appl. No.: 18/544,379

(22) Filed: Dec. 18, 2023

(65) Prior Publication Data
US 2024/0125969 A1 Apr. 18, 2024

(51) Int. Cl.
*G01V 11/00* (2006.01)
(52) U.S. Cl.
CPC .................. *G01V 11/002* (2013.01)
(58) Field of Classification Search
CPC .................................................. G01V 11/002
See application file for complete search history.

(56) References Cited

U.S. PATENT DOCUMENTS 3,342,258 A * 9/1967 Prats ..................... E21B 43/247
166/259

6,568,477 B1 * 5/2003 Dveyrin ................ E21B 43/121
166/370

(Continued)

FOREIGN PATENT DOCUMENTS

CN 104776971 A * 7/2015

OTHER PUBLICATIONS

Dong et al. "Experimental Study on Sand-Carrying Mechanism and Capacity Evaluation in Water-Producing Gas Wells and its Application in Artificial Lift Optimization" SPE-173700-MS (Year: 2014).*

(Continued)

*Primary Examiner* — John Fitzgerald
(74) *Attorney, Agent, or Firm* — Addison D. Ault; Richard P. Moerschell; IPGentleman Intellectual Property Services, LLC

(57) ABSTRACT

The present disclosure provides a method for experimentally determining a critical sand-carrying gas velocity of a shale gas well. The method includes: collecting well structure and production data, calculating parameter ranges of a gas flow velocity and a liquid flow velocity; carrying out a physical simulation experiment of sand carrying in the shale gas well to obtain the sand holding capacity of the wellbore under different experimental conditions, and calculating a sand holding rate; by observing a change curve of the sand holding rate of the wellbore vs. the gas flow velocity, defining a turning point, and sensitively analyzing the influence of other experimental variables on the turning point, to calculate the critical sand-carrying production of the shale gas well under different conditions. Therefore, this calculation method is simple and applicable, and provides a theoretical basis for the optimization design of water drainage and gas production process.

1 Claim, 3 Drawing Sheets

(56) References Cited

U.S. PATENT DOCUMENTS

| | | | | |
|---|---|---|---|---|
| 8,167,039 B2* | 5/2012 | Brannon | ............... | E21B 43/26 |
| | | | | 166/308.1 |
| 10,928,300 B2* | 2/2021 | Su | ..................... | G01N 19/02 |
| 2004/0020656 A1* | 2/2004 | Nicholson | ............. | E21B 43/00 |
| | | | | 166/370 |

OTHER PUBLICATIONS

Ibarra et al. "Investigation of Critical Sand-Deposition Velocity in Horizontal Gas/Liquid Stratified Flow" SPE Production & Operations SPE 168209 (Year: 2017).*
CNIPA CN202311116717.8 First Office Action dated Oct. 16, 2023, original Chinese pp. 1-3.
CNIPA CN202311116717.8 First Office Action dated Oct. 16, 2023, English translation; pp. 1-4.

* cited by examiner

METHOD FOR EXPERIMENTALLY DETERMINING CRITICAL SAND-CARRYING GAS VELOCITY OF SHALE GAS WELLS

CROSS-REFERENCE TO RELATED APPLICATION

This application claims priority to Chinese Patent Application No. 202311116717.8, filed on Sep. 1, 2023 before the China National Intellectual Property Administration, the disclosure of which is incorporated herein by reference in entirety.

TECHNICAL FIELD

The present disclosure relates to the field of water drainage and gas production of gas reservoir, and in particular to a method for experimentally determining a critical sand-carrying gas velocity of shale gas wells.

BACKGROUND

With the continuous promotion of the use of clean energy, unconventional clean energy represented by shale gas has gradually attracted attention. Due to the low permeability of shale gas reservoirs, horizontal-well staged multi-cluster fracturing technology is often used to develop shale gas reservoirs. However, the continuous production of formation fluids would cause parts of sand in the fractures to continuously flow into the wellbore. With reference to the production decline law of shale gas wells, in the initial stage, the production is high, the wellbore has strong sand-carrying capacity, and the sand grains/particles can be discharged from the wellbore. In the middle and later stages, gas production gradually decreases, resulting in a decrease in flow velocity of gas and liquid, and making it difficult for the sand in the wellbore to be carried out of the wellhead. In addition, the horizontal section of the shale gas horizontal well is long, and the sand is easy to be accumulated in the horizontal section, which blocks the fluid channels, increases the pressure drop of the production system, and affects the normal production of the shale gas well. Therefore, it is important for the safe production of shale gas well to accurately predict the critical sand-carrying gas velocity of the shale gas well, promptly remove the sand grains remaining in the wellbore, and ensure the smooth flow of underground production channels.

The research on the critical speed of sand carrying in shale gas wells has been developed so far, and a series of mechanism models and empirical models for sand carrying prediction have been proposed. Among them, the construction method of mechanism models focuses on the stress analysis of single sand grain, takes into account the gravity, buoyancy and drag force of the sand grain. However, a large amount of field practice and application show that the prediction effect of the model is poor. On the one hand, during the sand carrying process of the shale gas well, the sand grains close to the pipe wall migrate downward, while the sand near the center of the pipe is carried upward, it is impossible to represent the overall sand carrying capacity of the wellbore by using the migration condition of the single grain, on the other hand, the two-phase flow of gas and liquid in the wellbore during the production process of shale gas well is complex and diverse. As the gas production volume, liquid production volume, and well inclination angle, etc. change, different flow patterns such as bubble flow, slug flow, agitated flow and annular flow appear along the way, the presence of sand further increases the degree of chaos of the flow, and the mechanism model greatly simplifies the complex gas-liquid interface characteristic and the stress of sand grains, which reduces the prediction accuracy. Therefore, the prediction of the critical sand carrying velocity of the gas well is still dominated by the empirical models. The multiphase pipe flow experimental platform is used to carry out sand-carrying physical simulation experiments under different gas flow rates, liquid flow rates, well inclination angles and other conditions to observe the sand migration in the wellbore. Based on the experimental test results, the variation curve of the critical sand-carrying gas velocity under different conditions is obtained, and an empirical model of the critical sand-carrying gas velocity of the gas well is established by fitting.

To this end, the key to the establishment of an empirical model is to accurately obtain the critical sand-carrying flow velocities under different experimental conditions. At present, the critical sand-carrying gas velocity is determined experimentally mainly through observation, observing the migration of sand in the wellbore. When all the sand in the wellbore moves upward, the gas velocity at this time is defined as the critical sand-carrying gas velocity. However, during the experiment, the gas-liquid oscillation makes the movement trajectories of sand grains complex, and there is a certain degree of uncertainty in observing the flow condition of all the sand in the wellbore with the naked eyes. In addition, the sand in the wellbore is continuously supplied, and the sand close to the pipe wall is difficult to be carried out of the wellhead, the sand movement in the center of the oil pipe cannot be observed through the sand accumulated on the pipe wall, which increases the experimental error.

Therefore, the present disclosure aims at the problem that it is difficult to determine the critical sand-carrying gas velocity of the shale gas well. Based on the multi-phase pipe flow experimental platform, the flow law simulation experiment of the sand carried by the gas well is carried out. With reference to the flow law of sand grains in the wellbore, a method for experimentally determining the critical sand-carrying gas velocity of the shale gas well is proposed.

SUMMARY

The purpose of the present disclosure is to solve the problem that the sand production in the shale gas well affects the normal production of the gas well, and therefore a method for experimentally determining the critical sand-carrying gas velocity of the shale gas well is proposed, the method can facilitate timely removal of sand grains remaining in the wellbore and provide theoretical support for the stable production of the shale gas well.

The present disclosure proposes a method for experimentally determining the critical sand-carrying gas velocity of the shale gas well, and the experimental test is completed in a multiphase pipe flow experimental device. The device consists of a supply system, a measurement and control system and an experimental loop. The design of experimental test parameters needs to refer to the production dynamic characteristics of the shale gas well to determine the ranges of gas flow velocity, liquid flow velocity, oil pipe inner diameter, sand flow rate, sand grain diameter, sand density and well inclination angle under experimental conditions. In the production process of the shale gas well, the sand in the fractures is continuously produced, so that the sand in the wellbore exists at different production rates. Therefore, the sand holding rate of the wellbore is selected to represent the sand carrying capacity of the wellbore, which is consistent with the actual situation of the on-site shale gas well. In the initial stage, the shale gas well has high production and strong sand-carrying capacity, the sand is carried out of the wellhead, the sand holding rate of the wellbore is low, it does not affect the normal production of the gas well. In the mid-term stage, medium or high gas production and medium or low liquid production are obtained, as can be seen from the flow velocity profile distribution, the flow velocity is high at the center of the wellbore, while the flow velocity is low where it is close to the pipe wall, and the sand grains cannot be carried upward. The interaction between the two causes a small increase in the sand holding rate of the wellbore. In the later stage, it is with low pressure and low production, a large amount of sand grains accumulate in the wellbore, the sand holding rate increases rapidly, seriously affecting the production of the gas well. It indicates that there is a turning point in the sand holding rate of the wellbore. When the production is greater than the turning point, the sand holding rate of the wellbore is small, while when it is less than the turning point, the sand holding rate increases rapidly. For this reason, the turning point of the sand holding rate of the wellbore versus the change curve of the production is defined as the critical sand carrying gas velocity of the gas well. At this turning point, the sand holding rate of the wellbore is low and the sand can be carried away from the wellhead.

The supply system can provide continuous and stable gas, liquid and sand flow rate in the experimental loop. During the experiment, a gas control valve and a liquid control valve are respectively used and adjusted to control the fluid flow rate in the experimental loop.

The measurement and control system can provide instantaneously changing experimental data of gas flow velocity and liquid flow velocity. By adjusting the opening of electric valves at front ends of the gas flow meter and the liquid flow meter, the gas flow velocity, liquid flow velocity and sand flow rate are stabilized in set experimental parameters.

The experimental loop is formed from a plexiglass pipe combined with a rubber pipe, wherein the transparent pipe is convenient for observing the flow state of gas, liquid, and sand in the pipe; Electric butterfly valves are respectively installed at positions of 200 times and 500 times the diameter of the pipe away from the air inlet, and they are configured for measuring the sand holding rate of the wellbore.

In order to achieve the above purposes, the present disclosure provides a method for experimental determination of the critical sand-carrying gas velocity in the shale gas wells, including the following steps:

Step S1: collecting well structure data of the shale gas well and production data of the shale gas well over its entire life cycle, and calculating parameter ranges of a gas flow velocity and a liquid flow velocity under an experimental condition by means of a fluid mechanics similarity criterion, wherein an oil pipe inner diameter, sand flow rate, sand grain diameter, sand density and well inclination angle are consistent with parameters of the shale gas well;

(1.1) The wellbore pressure, gas density and liquid density profiles of the shale gas well are calculated by the Gray model, the gas flow velocity $v_{NSG}$ under experimental conditions is obtained using the fluid mechanics similarity criterion, the calculation formula thereof is as follows:

$$v_{NSG} = v_{HSG} \sqrt{\frac{\rho_{HG}(\rho_{NL} - \rho_{NG})}{\rho_{NG}(\rho_{HL} - \rho_{NG})}}$$

where PNG is the gas density under experimental conditions, kg/m$^3$; $\rho_{NL}$ is the liquid density under experimental conditions, kg/m$^3$; $\rho_{HG}$ is the gas density under gas well conditions, kg/m$^3$; $\rho_{HL}$ is the liquid density under gas well conditions, kg/m$^3$; $v_{HSG}$ is the gas flow velocity under gas well conditions, m/s; $v_{NSG}$ is the gas flow velocity under experimental conditions, m/s;

(1.2) The calculation formula of the liquid flow velocity $v_{NSL}$ under experimental conditions is:

$$v_{NSL} = \frac{Q_{SL}}{A};$$

where, $Q_{SL}$ is the liquid production of the gas well, m$^3$/s; A is the cross-sectional area of the oil pipe, m$^2$;

(1.3) The calculation formula of the sand flow rate $v_{NSS}$ under experimental conditions is:

$$v_{NSS} = \frac{Q_{SS}}{A};$$

where, $Q_{SS}$ is the sand production of the gas well, m$^3$/s;

S2: carrying out a physical simulation experiment of sand carrying in the shale gas well, and obtaining sand holding amounts of a wellbore under different conditions of gas flow velocity, liquid flow velocity, oil pipe inner diameter, sand flow rate, sand grain diameter, sand density and well inclination angle within experimental parameter ranges, and calculating a sand holding rate; ensuring accuracy of the experiment by starting to measure the sand holding amount of the wellbore after sand comes out of the wellhead uniformly and stably for three minutes under a condition that the gas flow velocity, the liquid flow velocity and the sand flow rate are stable at target parameters, and repeating the experiment three times to take an average value of the sand holding amounts, wherein the sand is dried before weighing, in order to avoid water attached to outer surfaces of the sand affecting the sand holding amounts;

(2.1) Check the sealing of the valves, calibrate the measurement and control system, and ensure the safe operation of the experimental loop;

(2.2) Use the drainage method to measure the density and particle size of the sand produced in the shale gas well, select the same experimental sample and put it into the sand tank; measure the length of the pipe in the wellbore test section;

(2.3) Adjust the target experimental parameters: when the flow in the wellbore is stable, close the electric butterfly valves in the middle of the pipe at the same time, collect the sand between the two electric butterfly valves, remove the water on the sand surface and weigh it, calculate the sand holding rate, and carry out the next experiment, wherein the calculation formula of the sand holding rate is:

$$H_S = \frac{V_S}{AL}$$

where, $H_S$ is the sand holding rate of the wellbore, dimensionless; $V_S$ is the sand volume, m$^3$; L is the length of the pipe in the wellbore test section, m;

the calculation formula of the sand volume is:

$$V_S = \frac{G_S}{D_S}$$

where, $G_S$ is the weight of the sand, kg; $D_s$ is the density of the sand, kg/m³;

Step S3: determining the critical sand-carrying gas velocity under different experimental conditions, and using the sand holding rate of the wellbore to characterize a sand carrying capacity of the gas well, wherein a small sand holding rate of the wellbore indicates that the sand occupies a small area of production channel of the gas well and the gas well is capable of producing stably, while a large sand holding rate affects stable production of the gas well; by observing a change curve of the sand holding rate of the wellbore vs. the gas flow velocity, defining a turning point at which the sand holding rate of the wellbore increases as the critical sand-carrying gas velocity, and analyzing an influence of each experimental variable on the turning point, to obtain the critical sand-carrying gas velocity under different experimental conditions;

wherein, in a coordinate system of the sand holding rate vs. the gas flow velocity wherein the change curve of the sand holding rate vs. the gas flow velocity has an obvious turning point, defining parts of the curve before and after the turning point as a low gas flow velocity curve and a high gas flow velocity curve, respectively, taking 5 data from ends of the two curves respectively, and using least squares to linearly fit straight lines; due to different slopes of two straight lines, finding an intersection point of linear-fitted straight lines of low gas flow velocity and high gas flow velocity, wherein the intersection point is the critical sand-carrying gas velocity corresponding to the gas flow velocity; changing the liquid flow velocity and obtain the change curve of the sand holding rate vs. the gas flow velocity under different liquid flow velocities, using the same method to determine the critical sand-carrying gas velocity under different liquid flow velocities; and changing the experimental variables of oil pipe inner diameter, sand flow rate, sand grain diameter, sand density and well inclination angle, to obtain the critical sand-carrying gas velocity under different experimental conditions;

In the coordinate system where the sand holding rate changes with the gas flow velocity, observe the data point distribution of the sand holding rate of the wellbore changing with the gas flow velocity. The experimental data points show that the gas flow velocity is high during annular flow and the sand holding rate of the wellbore is less than 0.01, and the sand holding rate increases as the gas flow velocity decreases. The least squares method is used to linearly fit the change of the sand holding rate with the gas flow velocity to obtain a straight line, the absolute value of the slope of the straight line is close to 0; while in the agitated flow, the gas flow velocity is low and the sand holding rate of the wellbore at low gas flow velocity is greater than that at high gas flow velocity, the change pattern of the sand holding rate with the gas flow velocity is consistent with that of the high gas flow velocity, the same method is used to fit the change of the sand holding rate with the gas flow velocity to obtain another straight line, the absolute value of the slope of the straight line is greater than 1. Therefore, the linearly-fitted straight lines for the low gas flow velocity and the high gas flow velocity have an intersection point; the right side of the intersection point indicates high gas flow velocity, and the low sand holding rate of the wellbore indicates that the sand occupies a small proportion of the production oil pipe, which does not affect the production of the gas well; the left side of the intersection point indicates low gas flow velocity, and the high sand holding rate of the wellbore indicates that the sand occupies a large proportion of the production oil pipe, which affects the production of the gas well; the intersection point indicates the minimum value of high gas flow velocity and the maximum value of low gas flow velocity, which are the critical value of the sand holding rate of the wellbore. The gas flow velocity corresponding to this point is determined to be the critical sand-carrying gas velocity. By changing the liquid flow velocity, the change curve of the sand holding rate with the change of gas flow velocity under different liquid flow velocities is obtained. The same method is used to determine the critical sand-carrying gas velocity under different liquid flow velocities, while by changing the experimental variables of oil pipe inner diameter, sand flow rate, sand grain diameter, sand density and well inclination angle, the critical sand-carrying gas velocity under different experimental conditions can be obtained;

Step S4: determining the sand carrying capacity of the shale gas well, wherein the Step S1 is used to determine the gas flow velocity and the liquid flow velocity of the shale gas well in production under experimental conditions, and Step S3 is used to determine a critical sand-carrying gas flow velocity under the same experimental condition of liquid flow velocity, oil pipe inner diameter, sand grain diameter, sand density and well inclination angle, compare the gas flow velocity of the shale gas well under the experimental condition with the corresponding critical sand-carrying gas flow velocity, wherein when the gas flow velocity of the shale gas well under the experimental condition is not less than the critical sand-carrying gas flow velocity, it indicates that the well is capable of continuing to produce stably; when the gas flow velocity of the shale gas well under the experimental condition is less than the critical sand-carrying gas flow velocity, it indicates that sand production of the well affects normal production of the gas well.

Compared with the prior art, the advantages of the present disclosure include:

The method for experimentally determining the critical sand-carrying gas velocity of the shale gas well described in the present disclosure fully considers the real flow state of the sand-carrying gas well, uses the fluid mechanics similarity criterion to carry out sand-carrying physical simulation experiments. In the present disclosure, it defines the critical sand-carrying gas velocity, and clearly shows the changing law of critical sand-carrying gas velocity, and further determines the critical sand-carrying yield of the shale gas well. Therefore, this method is accurate and applicable and provides theoretical support for stable production of the shale gas well.

DETAILED DESCRIPTION OF EMBODIMENTS

In order to make the purposes, calculation processes and advantages of the present disclosure clearer, the present disclosure will be further described in detail below in conjunction with the accompanying drawings. It should be understood that the specific embodiments described herein are only intended to explain the present disclosure but are not intended to limit the present disclosure.

The production process of shale gas well is always accompanied by the production of sand. If the sand carrying capacity of the gas well is insufficient, sand accumulation in the wellbore will affect normal production. For this reason, accurate calculation of the critical sand-carrying gas velocity of the shale gas well is the key to ensuring stable production of the shale gas well.

Figure 1:
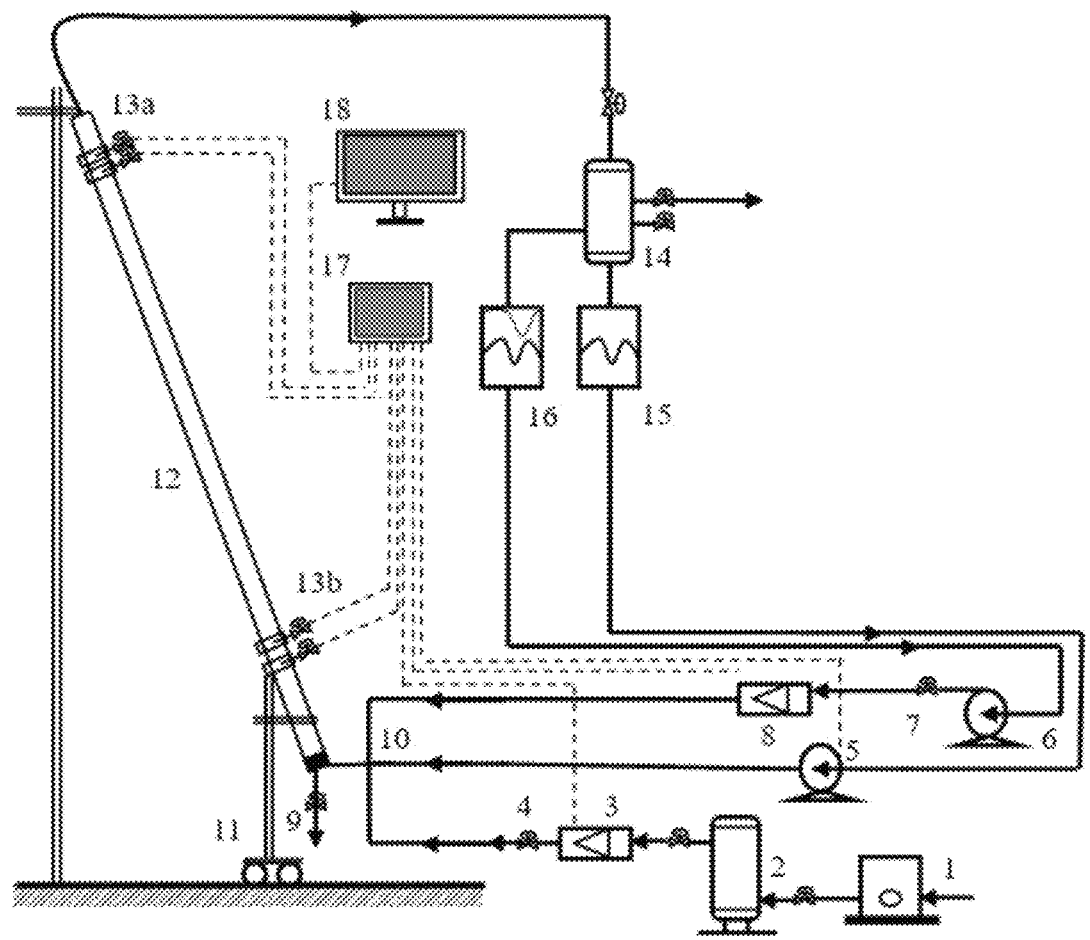
FIG. 1 is a schematic diagram of the experimental device; 1—Air compressor, 2—Gas storage tank, 3—Gas flow meter, 4—Gas flow rate control valve, 5—Variable frequency sand pump, 6—Centrifugal pump, 7—Liquid flow rate control valve, 8—Turbine liquid flow meter, 9—Sand discharging valve, 10—Four-way connector, 11—Sliding support frame, 12—Plexiglass pipe, 13a—Electric butterfly valve, 13b—Electric butterfly valve, 14—Gas-water-sand separator, 15—Sand tank, 16—Water tank, 17—Paperless recorder, 18—Computer.
Figure 2:
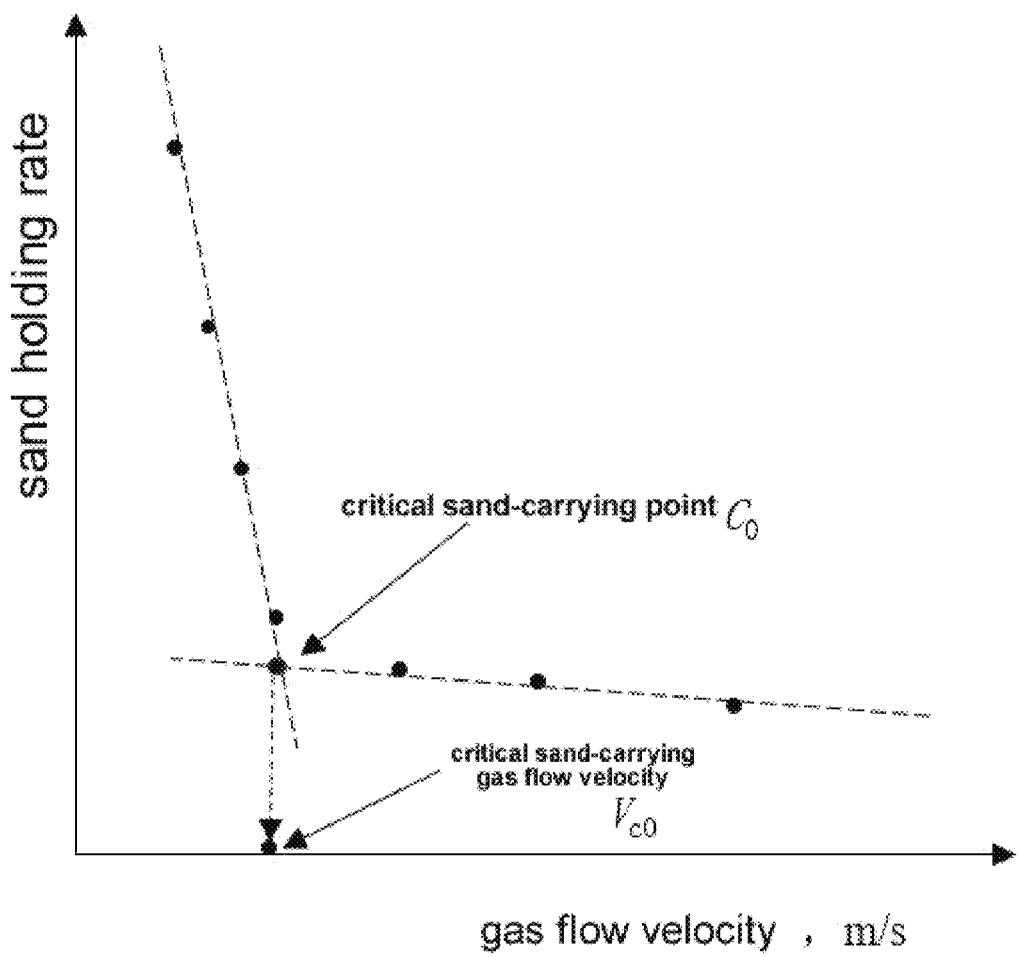
FIG. 2 is a schematic diagram of the change curve of sand holding rate.
Figure 3:
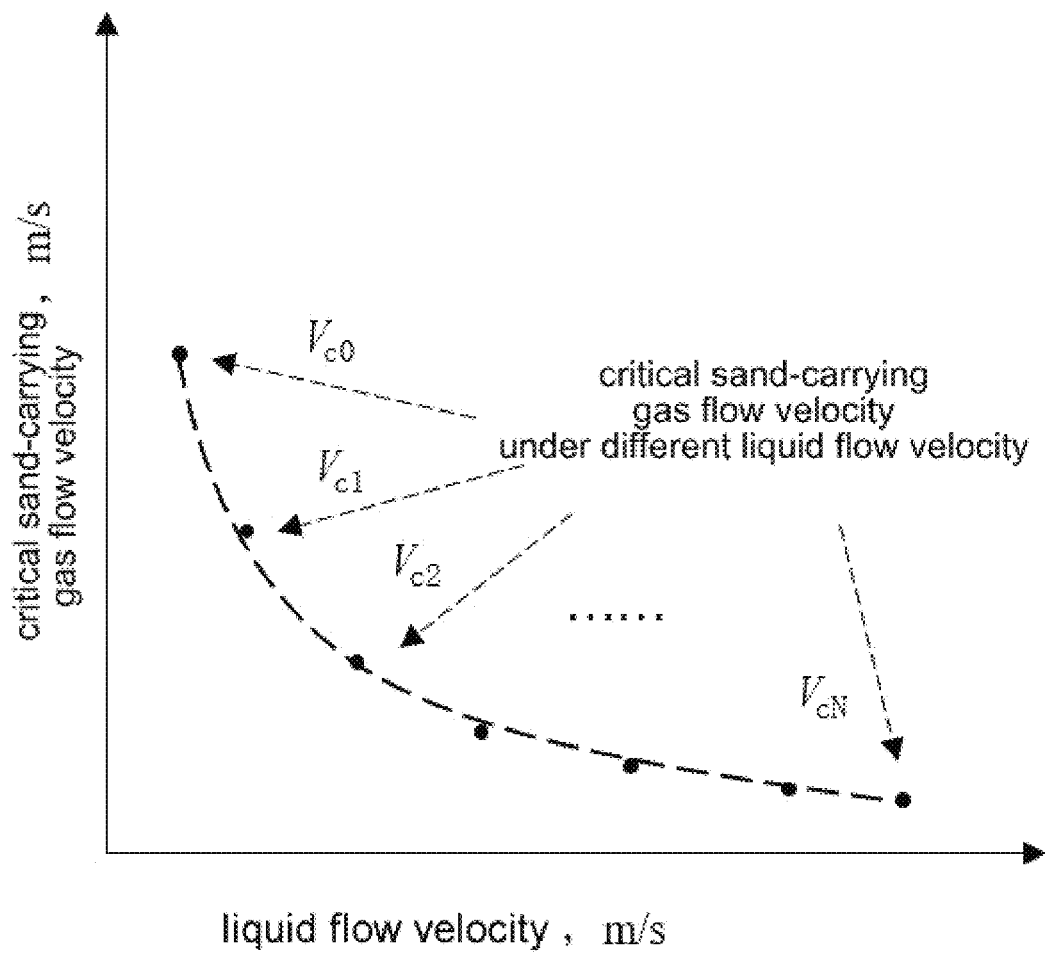
FIG. 3 is a schematic diagram of the change curve of the critical sand-carrying gas flow velocity vs. the liquid flow velocity.

Step S1: Experimental parameter design: collect the data of the shale gas well in its entire life cycle, such as gas production, liquid production, sand production, sand flow rate, sand grain diameter, sand density, wellhead oil pressure, wellhead casing pressure, wellbore trajectory, and oil pipe size, use the fluid mechanics similarity criterion to calculate and obtain the parameter ranges of gas flow velocity and liquid flow velocity under experimental conditions, wherein the inner diameter of the oil pipe, sand flow rate (flow velocity), sand grain diameter, sand density and well inclination angle are consistent with the parameters of the shale gas well. The corresponding calculation formulas are as follows:

(1.1) The wellbore pressure, gas density and liquid density profiles of the shale gas well are calculated by the Gray model, the gas flow velocity $v_{NSG}$ under experimental conditions is obtained using the fluid mechanics similarity criterion, the calculation formula thereof is as follows:

$$v_{NSG} = v_{HSG}\sqrt{\frac{\rho_{HG}(\rho_{NL} - \rho_{NG})}{\rho_{NG}(\rho_{HL} - \rho_{NG})}}$$

where $\rho_{NG}$ is the gas density under experimental conditions, kg/m³; $\rho_{NL}$ is the liquid density under experimental conditions, kg/m³; $\rho_{HG}$ is the gas density under gas well conditions, kg/m³; $\rho_{HL}$ is the liquid density under gas well conditions, kg/m³; $v_{HSG}$ is the gas flow velocity under gas well conditions, m/s; $v_{NSG}$ is the gas flow velocity under experimental conditions, m/s;

(1.2) The calculation formula of the liquid flow velocity $v_{NSL}$ under experimental conditions is:

$$v_{NSL} = \frac{Q_{SL}}{A};$$

where, $Q_{SL}$ is the liquid production of the gas well, m³/s; A is the cross-sectional area of the oil pipe, m²;

(1.3) The calculation formula of the sand flow rate $v_{NSS}$ under experimental conditions is:

$$v_{NSS} = \frac{Q_{SS}}{A};$$

where, $Q_{SS}$ is the sand production of the gas well, m³/s;

Step S2: carrying out a physical simulation experiment of sand carrying in the shale gas well (the experimental device is shown as FIG. 1), and obtaining sand holding amounts of a wellbore under different conditions of gas flow velocity, liquid flow velocity, oil pipe inner diameter, sand flow rate, sand grain diameter, sand density and well inclination angle within experimental parameter ranges, and calculating a sand holding rate; ensuring accuracy of experiment, starting to measure the sand holding amount of the wellbore after sand comes out of the wellhead uniformly and stably for three minutes under a condition that the gas flow rate, the liquid flow rate and the sand flow rate are stably at target parameters, and repeating the experiment three times to take an average value of the sand holding amounts, drying the sand before weighting, in order to avoid water attached to outer surfaces of the sand affecting the sand holding amounts. The specific process is:

(2.1) Check the sealing of the electric butterfly valve 13a, electric butterfly valve 13b, gas-water-sand separator 14, sand tank 15, water tank 16 and gas storage tank 2, calibrate the gas flow meter 3, turbine liquid flow meter 8 and paperless recorder 17, ensure the safe operation of the air compressor 1, centrifugal pump 6 and variable frequency sand pump 5 in the experimental loop;

(2.2) Use the drainage method to measure the density and particle size of the sand produced in the shale gas well, select the same experimental sample and put it into the sand tank 15; measure the length L of the pipe in the wellbore test section between the electric butterfly valve 13a and the electric butterfly valve 13b in the middle of the plexiglass (organic glass) pipe 12;

(2.3) Adjust the gas flow rate control valve 4 to the target gas flow rate, adjust the liquid flow rate control valve 7 to the target liquid flow rate, adjust the variable frequency sand pump 5 to the target sand flow rate, replace the plexiglass pipe 12 with a plexiglass pipe having the target oil pipe inner diameter, and adjust the sliding support frame 11 to the target well inclination angle. When the gas, water and sand in the oil pipe flow stably for three minutes, use the computer 18 to close the electric butterfly valve 13a and the electric butterfly valve 13b in the middle of the pipe, and close the gas flow rate control valve 4, the liquid flow rate control valve 7 and the variable frequency sand pump 5 at the same time, discharge the water and sand below the electric butterfly valve 13b in the plexiglass pipe 12 through the sand discharging valve 9; open the electric butterfly valve 13b, collect the sand between the electric butterfly valve 13a and the electric butterfly valve 13b at the position of the sand discharging valve 9, and remove the water on the sand surface and weigh it, calculate the sand holding rate; close the sand discharging valve 9 and open the electric butterfly valve 13a to carry out the next set of experimental tests;

wherein the calculation formula of the sand holding rate is:

$$H_S = \frac{V_S}{AL}$$

where, $H_S$ is the sand holding rate of the wellbore, dimensionless; $V_S$ is the sand volume, m³; L is the length of the pipe in the wellbore test section, m;

the calculation formula of the sand volume is:

$$V_S = \frac{G_S}{D_S}$$

where, $G_S$ is the weight of the sand, kg; $D_s$ is the density of the sand, kg/m³;

Step S3: determining the critical sand-carrying gas velocity under different experimental conditions, and using the sand holding rate of the wellbore to characterize a sand carrying capacity of the gas well, wherein a small sand holding rate of the wellbore indicates that the sand occupies a small area of production channel of the gas well and the gas well is capable of producing stably, while a large sand holding rate affects stable production of the gas well; by observing a change curve of the sand holding rate of the wellbore vs. the gas flow velocity, defining a turning point at which the sand holding rate of the wellbore increases as the critical sand-carrying gas velocity, and sensitively analyzing an influence of each experimental variable on the turning point, to obtain the critical sand-carrying gas velocity under different experimental conditions. The specific process is:

In the coordinate system where the sand holding rate changes with the gas flow velocity, as shown in FIG. 2, observe the data point distribution of the sand holding rate of the wellbore changing with the gas flow velocity. The experimental data points show that the gas flow velocity is high during annular flow and the sand holding rate of the wellbore is less than 0.01, and the sand holding rate increases as the gas flow velocity decreases. The least squares method is used to linearly fit the change of the sand holding rate with the gas flow velocity to obtain a straight line, the absolute value of the slope of the straight line is close to 0; while in the agitated flow, the gas flow velocity is low and the sand holding rate of the wellbore at low gas flow velocity is greater than that at high gas flow velocity, the change pattern of the sand holding rate with the gas flow velocity is consistent with that of the high gas flow velocity, the same method is used to fit the change of the sand holding rate with the gas flow velocity to obtain another straight line, the absolute value of the slope of the straight line is greater than 1. Therefore, the linearly-fitted straight lines for the low gas flow velocity and the high gas flow velocity have an intersection point $C_0$; the right side of the intersection point indicates high gas flow velocity, and the low sand holding rate of the wellbore indicates that the sand occupies a small proportion of the production oil pipe, which does not affect the production of the gas well; the left side of the intersection point indicates low gas flow velocity, and the high sand holding rate of the wellbore indicates that the sand occupies a large proportion of the production oil pipe, which affects the production of the gas well; the intersection point indicates the minimum value of high gas flow velocity and the maximum value of low gas flow velocity, which are the critical value of the sand that does not affect gas well production. The gas flow velocity corresponding to this point is determined to be the critical sand-carrying gas velocity $V_{c0}$. By changing the liquid flow velocity, the change curve of the sand holding rate with the change of gas flow velocity under different liquid flow velocities is obtained. The same method is used to determine the critical sand-carrying flow velocities $V_{c1}$, $V_{c2}$ . . . . $V_{cN}$ under different liquid flow velocities, as shown in FIG. 3, while by changing the experimental variables of oil pipe inner diameter, sand flow rate, sand grain diameter, sand density and well inclination angle, the critical sand-carrying gas velocity under different experimental conditions can be obtained;

Step S4: determining the sand carrying capacity of the shale gas well, wherein the Step S1 is used to determine the gas flow velocity and the liquid flow velocity of the shale gas well in production under experimental conditions, the Step S3 is used to determine a critical sand-carrying gas flow velocity under the same experimental condition of liquid flow velocity, oil pipe inner diameter, sand grain diameter, sand density and well inclination angle, compare the gas flow velocity of the shale gas well under the experimental condition with the corresponding critical sand-carrying gas flow velocity, wherein when the gas flow velocity of the shale gas well under the experimental condition is not less than the critical sand-carrying gas flow velocity, it indicates that the well is capable of continuing to produce stably; when the gas flow velocity of the shale gas well under the experimental condition is less than the critical sand-carrying gas flow velocity, it indicates that sand production of the well affects normal production of the gas well.

Those of ordinary skill in the art would realize that the embodiments described herein are to help readers understand the implementation method of the present disclosure, and it should be understood that the protection scope of the present disclosure is not limited to such specific statements and embodiments. Those of ordinary skill in the art can make various other specific modifications and combinations based on the technical teachings disclosed in the present disclosure without departing from the spirit of the present disclosure, and these modifications and combinations are still within the protection scope of the present disclosure.

What is claimed is:

1. A method for experimentally determining a critical sand-carrying gas velocity of a shale gas well, comprising:
    Step S1: collecting well structure data of the shale gas well and production data of the shale gas well over its entire life cycle, and calculating parameter ranges of a gas flow velocity and a liquid flow velocity under an experimental condition by means of a fluid mechanics similarity criterion, wherein an oil pipe inner diameter, sand flow rate, sand grain diameter, sand density and well inclination angle are consistent with parameters of the shale gas well;
    Step S2: carrying out a physical simulation experiment of sand carrying in the shale gas well, and obtaining sand holding amounts of a wellbore under different conditions of gas flow velocity, liquid flow velocity, oil pipe inner diameter, sand flow rate, sand grain diameter, sand density and well inclination angle within experimental parameter ranges, and calculating a sand holding rate; ensuring accuracy of the experiment by starting to measure the sand holding amount of the wellbore after sand comes out of the wellhead uniformly and stably for three minutes under a condition that the gas flow velocity, the liquid flow velocity and the sand flow rate are stable at target parameters, and repeating the experiment three times to take an average value of the sand holding amounts, wherein the sand is dried before weighing, in order to avoid water attached to outer surfaces of the sand affecting the sand holding amounts;
    Step S3: determining the critical sand-carrying gas velocity under different experimental conditions, and using the sand holding rate of the wellbore to characterize a sand carrying capacity of the gas well, wherein a small sand holding rate of the wellbore indicates that the sand occupies a small area of production channel of the gas well and the gas well is capable of producing stably, while a large sand holding rate affects stable production of the gas well; by observing a change curve of the sand holding rate of the wellbore vs. the gas flow velocity, defining a turning point at which the sand holding rate of the wellbore increases as the critical sand-carrying gas velocity, and analyzing an influence of each experimental variable on the turning point, to obtain the critical sand-carrying gas velocity under different experimental conditions;

and, in a coordinate system of the sand holding rate vs. the gas flow velocity wherein the change curve of the sand holding rate vs. the gas flow velocity has an obvious turning point, defining parts of the curve before and after the turning point as a low gas flow velocity curve and a high gas flow velocity curve, respectively, taking 5 data from ends of the two curves respectively, and using least squares to linearly fit straight lines; due to different slopes of two straight lines, finding an intersection point of linear-fitted straight lines of low gas flow velocity and high gas flow velocity, wherein the intersection point is the critical sand-carrying gas velocity corresponding to the gas flow velocity; changing the liquid flow velocity and obtain the change curve of the sand holding rate vs. the gas flow velocity under different liquid flow velocities, using the same method to determine the critical sand-carrying gas velocity under different liquid flow velocities; and changing the experimental variables of oil pipe inner diameter, sand flow rate, sand grain diameter, sand density and well inclination angle, to obtain the critical sand-carrying gas velocity under different experimental conditions;

Step S4: determining the sand carrying capacity of the shale gas well, wherein the Step S1 is used to determine the gas flow velocity and the liquid flow velocity of the shale gas well in production under experimental conditions, and Step S3 is used to determine a critical sand-carrying gas flow velocity under the same experimental condition of liquid flow velocity, oil pipe inner diameter, sand grain diameter, sand density and well inclination angle, compare the gas flow velocity of the shale gas well under the experimental condition with the corresponding critical sand-carrying gas flow velocity, wherein when the gas flow velocity of the shale gas well under the experimental condition is not less than the critical sand-carrying gas flow velocity, it indicates that the well is capable of continuing to produce stably; when the gas flow velocity of the shale gas well under the experimental condition is less than the critical sand-carrying gas flow velocity, it indicates that sand production of the well affects normal production of the gas well.

* * * * *